J. G. KUENZINGER.
SECTIONAL DEMOUNTABLE RIM.
APPLICATION FILED DEC. 26, 1919.
1,401,542.
Patented Dec. 27, 1921.
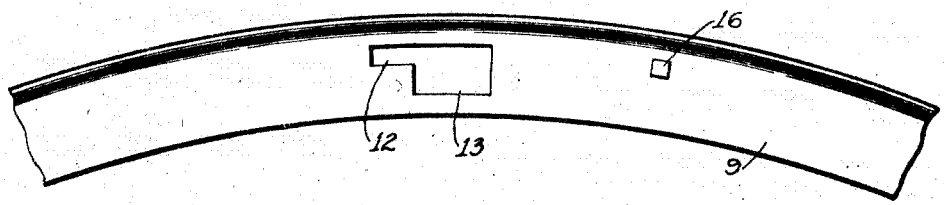
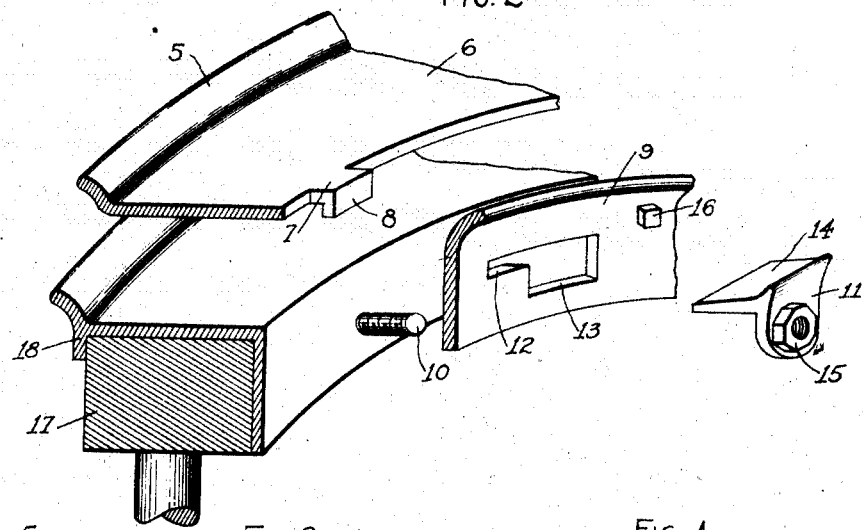
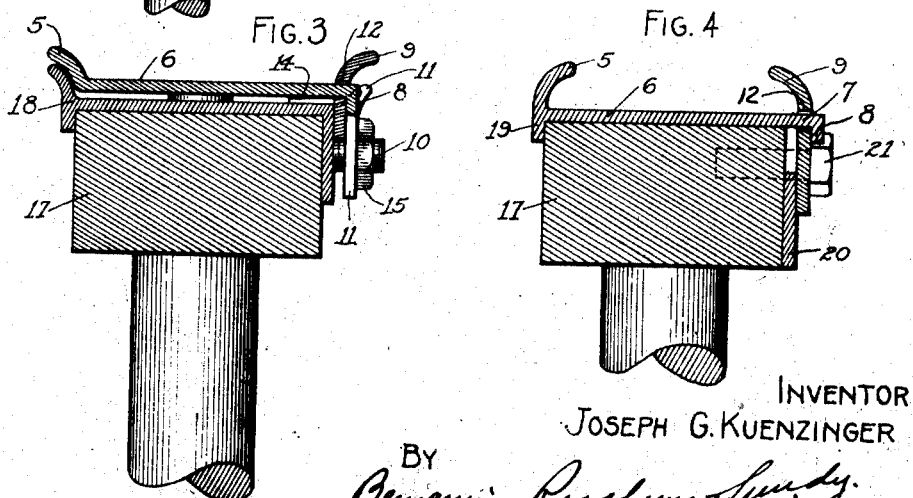
INVENTOR
JOSEPH G. KUENZINGER
BY
Benjamin, Rosehouse & Lundy
ATTYS.

UNITED STATES PATENT OFFICE.

JOSEPH G. KUENZINGER, OF CHICAGO, ILLINOIS.

SECTIONAL DEMOUNTABLE RIM.

1,401,542.

Specification of Letters Patent.  Patented Dec. 27, 1921.

Application filed December 26, 1919.  Serial No. 347,333.

*To all whom it may concern:*

Be it known that I, JOSEPH G. KUENZINGER, a citizen of the United States, and resident of Chicago, in the county of Cook and State of Illinois, have invented certain new and useful Improvements in Sectional Demountable Rims, of which the following is a specification.

My invention relates to vehicle wheels, and more particularly to tire-receiving means which are employed for securing a pneumatic tire upon the felly of a motor vehicle wheel.

Specifically, my invention has for its object the provision of means for quickly and effectively attaching and detaching a tire to or from its carrying rim and upon the felly and rim of a wheel. This I prefer to do by means of an annulus or ring that interlocks with a specially designed tire rim and is locked or clamped to the wheel rim or felly by the wedge-clips usually employed in connection with a demountable structure for tires.

My invention is applicable to pneumatic tire-receiving rims which are permanently secured to the felly of the wheel as well as to tire-receiving rims for either clencher-beaded or straight-sided pneumatic tire casings.

The objects of my invention are the provision of a structure, simple in arrangement and economical to manufacture, which can be operated by the unskilled motorist in a minimum of time and without the bother now encountered in changing casings upon a rim and the changing of rims upon the wheel, whichever in the particular case may be necessary. It will also be seen from the following description and accompanying illustration that my invention may be employed in connection with either straight-sided or clencher tires and with the ordinary wheels arranged for the receipt of demountable tires without any change in the tires or the wheels as they are already made and procurable upon the market.

I prefer to accomplish the above mentioned objects by means of the instrumentalities illustrated in the accompanying drawings, in which—

Figure 1 is a fragmentary elevation of a portion of the tire locking ring employed in my new tire receiving rim.

Fig. 2 is a fragmentary perspective of a typical form of wheel felly and felly band with the parts of my tire receiving rim and the means for securing it to the wheel; the parts being separated and about to be assembled.

Fig. 3 is a transverse section of the structure, shown in Fig. 2 in assembled form.

Fig. 4 is a transverse section of my invention applied to a rim fixed to the wheel felly, the style of rim in this case being for the reception of a clencher tire, although it will be obvious that my invention is applicable to rims for receiving straight-sided tires or clencher tires and whether the rims be fixed to the felly or demountable.

In the drawings, similar reference characters are employed to designate the same parts throughout the divers views, and by reference to Fig. 2 it will be seen that my tire receiving rim comprises a member formed to provide one flange 5 and the bottom 6 of a tire receiving rim. Bottom 6 extends to the place of juncture of the demountable flange, hereinafter to be described, and has extended from its edge at suitable intervals (four, five or six, as may be desired) tongues 7, the outer portions 8 of which are turned downward at right angles to bottom 6, sufficient room being left between the edge of the bottom and the downturned portion 8 of the tongue to receive the detachable flange therebetween.

The detachable flange 9 is annular or ring shaped and of sufficient width to provide the necessary height to receive the edge of a tire casing and to extend down upon the side of the felly to the threaded stud 10 usually provided upon wheels arranged to receive demountable rims for the receipt of the wedge-clip 11 usually employed to secure the demountable rim upon the wheel. At suitable intervals the detachable flange 9 has provided therein concentric slots each having a restricted or narrow portion 12 of such dimensions as to receive the shank portion of tongue 7 and joining therewith is a wider portion 13 large enough to receive the headers or downturned portion 8 of the tongue or the tapered wedging portion 14 of wedge-clip 11.

The manner of assembling this structure is as follows: The tire casing, with the tube therein, is placed upon the member constituting flanges 5 and bottom 6, and flange or ring 9 is then brought so that the headed or downturned portions 8 of the tongues extend through the enlarged portions 13 of the slots provided therein. Flange 9 is now rotated so as to cause the shank portions 7 of the tongues to enter narrow portions 12 of the slots in which position the flange is prevented from being moved laterally by the heads or downturned portions 8 of the tongues. The tire rim, and flange thus assembled may now be placed on the felly band of the wheel, if it has not already been so placed, and the tapered portions 14 of the wedge clips are introduced into enlarged portions 13 in the slots of flange 9 and between bottom 6 of the tire-receiving member and the felly band; wedge-clips 11 being secured in position in the usual manner by turning nuts 15 down upon the threaded studs 10 extending from the felly. For convenience in starting the flange when beginning to disassemble the structure or in seating the structure when finishing the assembly, I have provided flange ring 9 with embossments or teats 16 against which a screw-driver or chisel may be driven.

In Figs. 2 and 3 the felly body 17 is shown provided with a conventional form of felly band 18, but in Fig. 4, I have shown the member constituting flange 5 and bottom 6 provided with oppositely extending flanges 19 and 20 for fixedly securing this member to the felly of a wheel; in such case the tongues 7 and downwardly bent ends 8 may be punched out of and produced from a portion of the flange 20. Where the tire-receiving rim is fixedly secured to the felly wedge-clips are not necessary and only a single threaded bolt 21 is required to pass through the enlarged portion 13 of one of the slots for securing flange 9 in assembled position.

What I claim as new is:—

1. A rim for receiving a tire formed of two circumferentially extending parts provided with lug and slot connections that are engaged by relative circumferential movement of said members, and means coacting with the wheel structure and entering the slot whereby the rim members are locked against reverse circumferential movement.

2. In combination a wheel, a demountable rim thereon, the said rim formed of two circumferentially extending parts provided with lug and slot connections that are engaged by relative circumferential movement of the rim members, and means entering the slots whereby the rim members are locked against reverse circumferential movement and the rim is secured to the wheel.

3. The combination with the felly of a wheel of a tire-receiving and holding structure detachably mounted thereon and comprising a flat rim body having a lateral flange along one edge, a substantially L-shaped lug projecting from the opposite edge of said rim body, a ring disposed laterally with said rim body and having an irregular shaped slot with which said lug is adapted to assemble, and, wedging means coacting with said slot to retain said lug in position therein and adapted to enter between the felly and the adjacent portion of the rim body to retain the latter upon said felly.

Signed at Chicago, county of Cook and State of Illinois, this 22d day of December, 1919.

JOSEPH G. KUENZINGER.